UNITED STATES PATENT OFFICE.

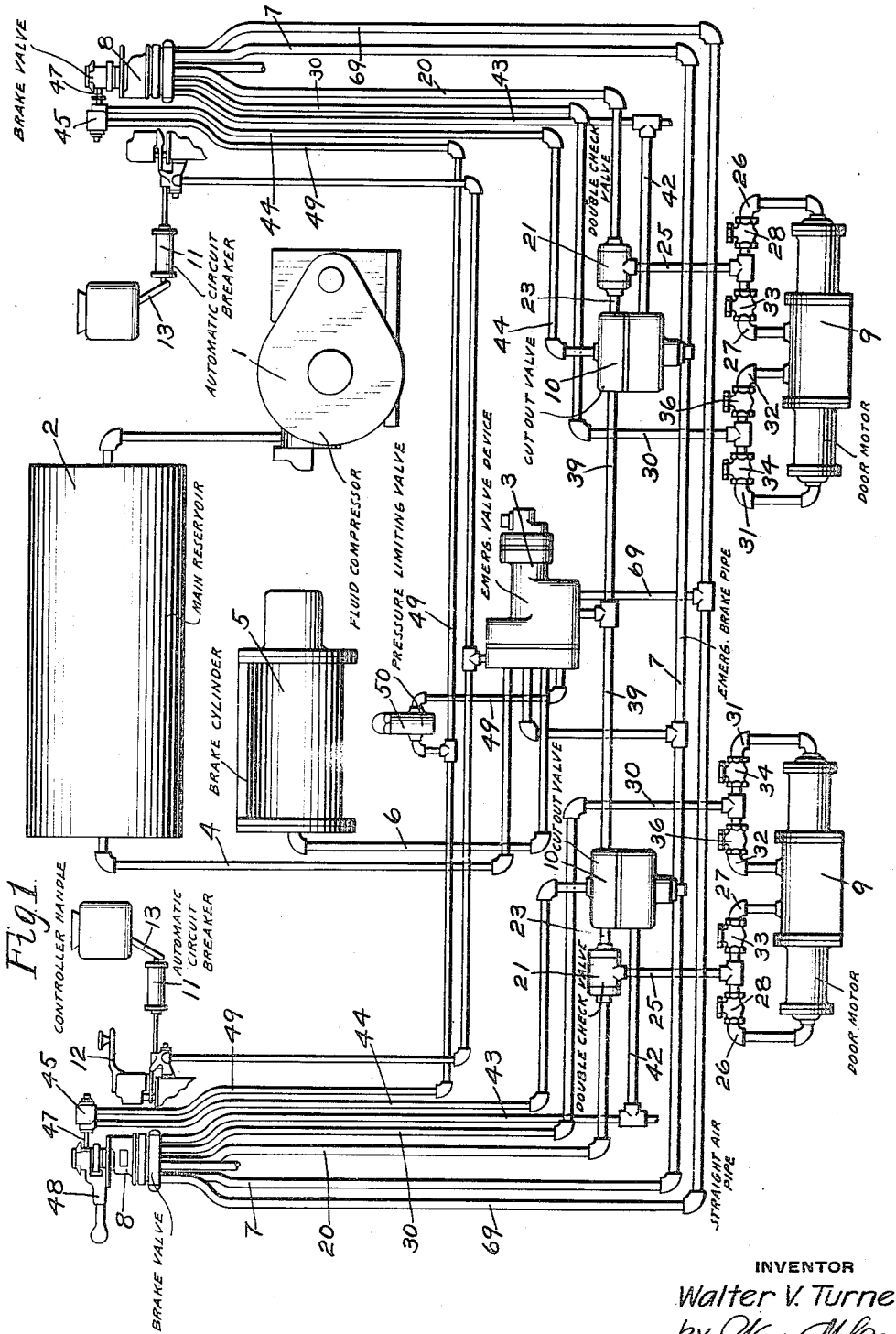

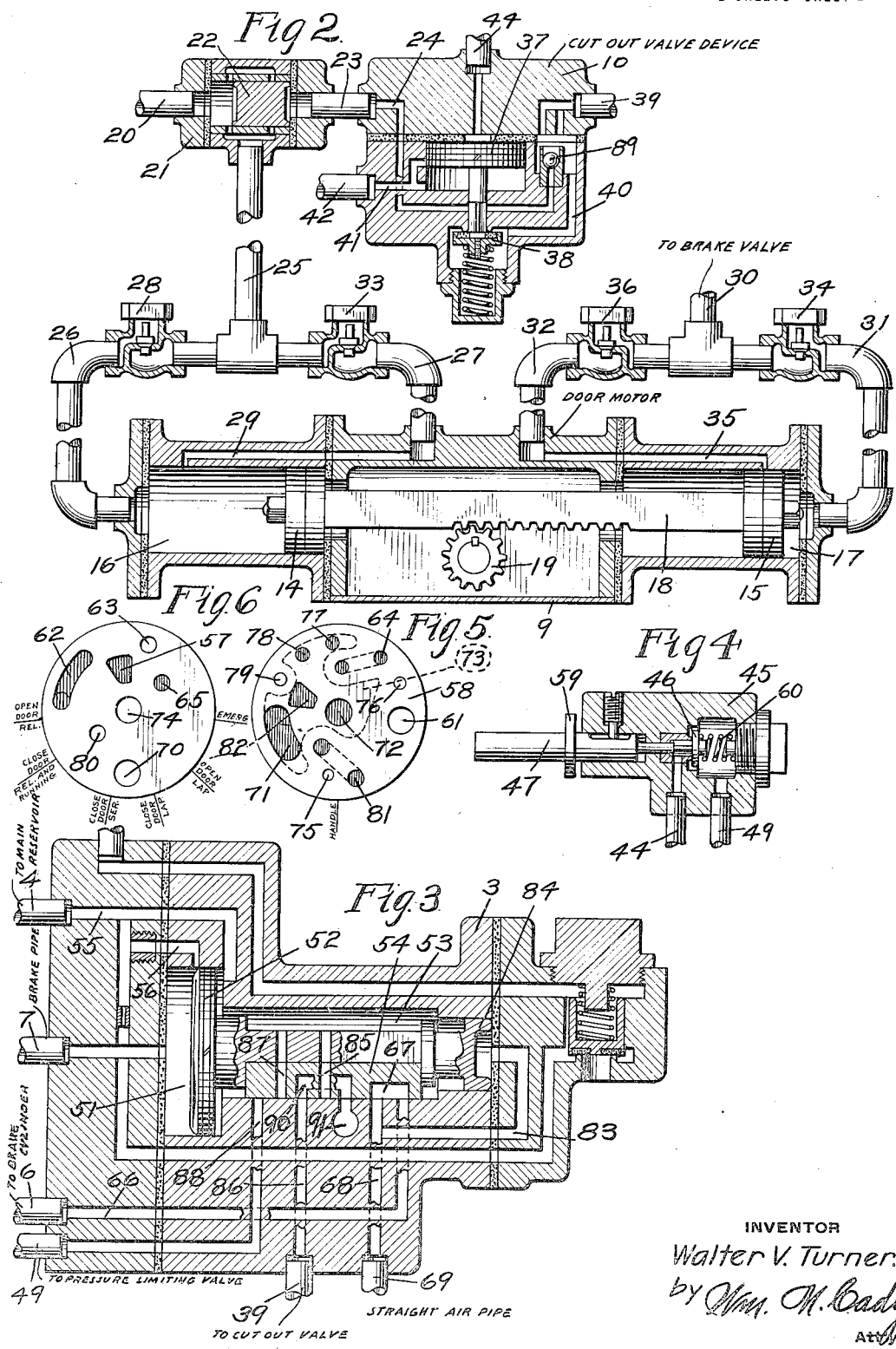

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMATIC CUT-OUT VALVE.

1,297,509.     Specification of Letters Patent.   Patented Mar. 18, 1919.

Application filed May 26, 1916. Serial No. 99,966.

*To all whom it may concern:*

Be it known that I, WALTER V. TURNER, a citizen of the United States, residing at Wilkinsburg, in the county of Allegheny and State of Pennsylvania, have invented new and useful Improvements in Automatic Cut-Out Valves, of which the following is a specification.

This invention relates to air brake and safety car control equipments, and more particularly to a double end equipment in which the apparatus may be operated from either end of the car.

In equipments of the above character, means may be provided for controlling the car doors and steps and for sanding the rails either by operation of a manually controlled valve or automatically upon operation of an emergency valve device to effect an application of the brakes.

When the equipment is of the double end type, it is desirable to prevent opening of the car doors and steps and sanding of the rails at the rear end of the car, and one object of my invention is to provide means for automatically accomplishing this purpose.

Another object of the invention is to provide improved means for cushioning the action of the door and step controlling motor, to prevent undue slamming of the doors in opening and closing same.

Other objects and advantages will appear in the following more detailed description of the invention.

In the accompanying drawings; Figure 1 is a diagrammatic view of a double end air brake and safety car control equipment embodying my invention; Fig. 2 a sectional view of the door and step controlling motor and the valve device for automatically cutting out of action at the rear end of the car, the door and step motor and the sanding of the rails; Fig. 3 a central sectional view of the emergency valve device; Fig. 4 a sectional view of the fluid pressure controlling valve for the sander; Fig. 5 a face view of the rotary valve of the combined brake and door controlling valve; and Fig. 6 a plan view of the rotary valve seat.

As shown in Fig. 1 of the drawings, the car equipment may comprise a compressor 1 for supplying fluid under pressure to a main reservoir 2, an emergency valve device 3 connected by pipe 4 to main reservoir 2, a brake cylinder 5 connected to the emergency valve device 3 by pipe 6, an emergency brake pipe 7, connected to the emergency valve device and to a brake valve 8 at each end of the car, a door and step controlling motor 9 and a cut out valve device 10 at each end of the car, and a device 11 operated when the hand is removed from the controller handle 12 for actuating a power circuit breaker 13.

The door and step controlling motor 9 may comprise pistons 14 and 15 contained in the respective piston chambers 16 and 17 and connected by a piston rod 18 having rack teeth adapted to engage the teeth of a pinion 19, the rotation of which is adapted to effect the opening and closing of the car doors and steps.

The doors are opened by supplying fluid to piston 14 and for controlling the admission and release of fluid to and from said piston, a pipe 20 leads from the brake valve 8 to one side of a double check valve device 21 having a double check valve 22, the opposite side being connected by pipe 23 to a passage 24 in the cut out valve device 10. A pipe 25 leading from the double check valve device 21 has branches 26 and 27, the branch 26 leading to the outer end of the piston chamber 16 and containing a check valve 28 for preventing flow from the piston chamber to pipe 25, and the branch 27 leading to a passage 29 which opens into piston chamber 16 at an intermediate point and containing a check valve 33 for preventing flow from pipe 25 to piston chamber 16.

For closing the car doors a pipe 30 is connected to each brake valve 8 and has branches 31 and 32, the branch 31 leading to the outer end of piston chamber 17 and containing a check valve 34 for preventing flow from piston chamber 17 to pipe 30, and branch 32 leading to a passage 35 opening into piston chamber 17 at an intermediate point and containing a check valve 33 for preventing flow from pipe 30 to piston chamber 17.

The cut out valve device 10 may comprise a casing containing a piston 37 for operating a valve 38 adapted to control the admission of fluid from the emergency valve device 3 through a pipe 39 and passage 40 to passage 24. Piston 37 also controls a passage 41 leading to pipe 42 which connects with pipe 43 through which fluid is supplied to effect the sanding of the rails. Fluid pressure for operating piston 37 is supplied through a pipe 44 leading to a valve device 45 containing a puppet valve 46 adapted to be operated by a stem 47 when the brake valve handle 48 is applied to the brake valve 8 for opening communication from pipe 44 to a pipe 49 leading to the emergency valve device 3 and preferably containing a pressure limiting valve 50 for limiting the degree of pressure supplied to the pipe 44.

The emergency valve device 3 may comprise a casing having a piston chamber 51 connected to brake pipe 7 and containing a piston 52 and a valve chamber 53 connected to main reservoir pipe 4 and containing a slide valve 54.

In operation, fluid is supplied from the main reservoir 2 through pipe 4 and passage 55 to valve chamber 53 of the emergency valve device and through passage 56 to piston chamber 51 and brake pipe 7.

The emergency brake pipe 7 leads to a port 57 in the seat of the rotary valve 58 of the brake valve 8 and is also constantly connected to the rotary valve chamber so that the brake pipe constitutes the fluid supply for the brake valve.

When the brake valve handle 48 is applied to the brake valve at the operating end of the car, a collar 59 on stem 47 is manually pressed inwardly and with the handle in position, the stem 47 is held in this position, so that the valve 46 is maintained off its seat, thus permitting flow of fluid from pipe 49 to pipe 44. At the opposite end of the car, since the brake valve handle has been removed, the valve 46 is held closed by a spring 60.

With the brake valve handle 48 in the normal release and running position, a through port 61 in the rotary valve 58 registers with a cavity 62 in the valve seat which leads to pipe 30, so that fluid is supplied through said pipe, past check valve 34 to pipe 31 and piston chamber 17 at the door operating motor. In this position, port 63 leading to pipe 20 is connected by cavity 64 in the rotary valve with an exhaust port 65, so that fluid is vented from piston chamber 16 of the door operating motor, through passage 29, pipe 27, past check valve 33 to pipe 25, and thence around double check valve 22 to pipe 20.

The piston rod 18 is therefore shifted to the left by piston 15, thus operating pinion 19 to effect the closing of the car doors and steps.

The emergency valve device 3 is now in release position and the brake cylinder 5 is connected to the exhaust through pipe 6, passage 66, cavity 67 in slide valve 54, passage 68, and straight air pipe 69, which leads to a port 70 in the rotary valve seat, the port 70 being connected by port openings 71 and 72 of a cavity 73 in the rotary valve with an exhaust port 74.

If it is desired to effect a service application of the brakes, the brake valve handle is turned to service position, in which a through port 75 in the rotary valve registers with straight air port 70. Fluid is then supplied from the rotary valve chamber to straight air pipe 69 and thence through passage 68, cavity 67, and passage 66 to the brake cylinder.

In this position, port 61 as well as a port 76 registers with cavity 62, so that fluid pressure is maintained on piston 15 of the door controlling motor, while port 63 is connected to the exhaust through a port opening 77 of rotary valve cavity 73, so that the car doors are held closed in this position.

At the non-operating end of the car, the handle is removed in the "lap position with the door closed" and in this position of the brake valve, port 76 still registers with cavity 62, while port 63 is connected to the exhaust through a port opening 78 of cavity 73, so that in the door motor at the rear end of the car, fluid is maintained on the door closing piston 15 while fluid is vented from the door opening piston 14, thus holding the rear door closed.

If it is desired to open the front door while holding the brakes applied, as when the car is stopped to unload passengers, the brake valve handle is turned to "lap position with the door opened," in which port opening 77 registers with the door closed cavity 62, so that fluid is vented from piston chamber 17, while through port 79 in the rotary valve registers with port 63. Fluid supplied through port 63 flows through pipe 20 past the double check valve 22 to pipe 25 and thence through pipe 26, past check valve 28 to piston chamber 16, thus effecting the movement of piston 14 and piston rod 18 to open the car door.

In order to cushion the action of the door and prevent slamming of same, it will be noted that fluid can only escape from piston chamber 17 by way of passage 35, since the check valve 34 in pipe 31 prevents flow in this direction, and consequently, while a free and quick movement of the piston obtains during the first movement thereof, as soon as the piston passes over the port opening of passage 35, the remaining fluid in piston chamber 17 is bottled up and is compressed by the further movement of the piston, so as to form an air cushion. In the same manner, an air cushion is provided when the door motor is operated to effect the closing of the car door, as will be clear.

The brakes may be released and the car door held closed by moving the brake valve handle to release and running position, in the manner hereinbefore described, or if it is desired to release the brakes and open the car door, the brake valve handle is turned to "release position with the door open" in which a cavity 81 connects cavity 62 with an exhaust port 80, so that fluid is vented from the door closing position 15, while through port 76 registers with port 63, so that fluid is supplied to the door opening piston 14, the straight air port 70 being in communication with port opening 71, so that the brakes are released as hereinbefore described.

If it is desired to effect an emergency application of the brakes by manipulation of the brake valve, the brake valve handle is turned to emergency position, in which fluid is vented from the emergency brake pipe 7 through port 57 to a registering port opening 82 of the exhaust cavity 73. Fluid is also supplied to the straight air pipe 69 through the registration of ports 70 and 61, so that fluid is supplied to passage 68 in the emergency valve device and thence through a passage 83 to piston 84.

The emergency piston 52 is shifted by the reduction in emergency brake pipe pressure to application position, in which passage 66 is uncovered, so that fluid is supplied from the main reservoir directly to the brake cylinder to effect an emergency application of the brakes.

In this position, a through port 85 in the slide valve 54 registers with a passage 86, so that fluid is supplied to pipe 39 and thence flows to the cut out valve device 10. Fluid also flows through a port 87 to a passage 88 and thence to pipe 49. The valve 46 is opened at the operating end of the car, as before explained, so that fluid is supplied from pipe 49 to pipe 44 and thence to the piston 37 of the cut out valve device 10 at the operating end of the car.

Piston 37 is then operated to open valve 38, so that fluid can flow from pipe 39, which is supplied with fluid by the emergency valve, through passage 40 to passage 24, operating the double check valve 22, so as to permit fluid to flow to pipe 25 and thence to the piston 14 of the door operating motor. In emergency position of the brake valve, cavity 62 registers with port openings 77 and 78, so that pipe 20 is open to the atmosphere, insuring the prompt movement of the double check valve 22 by the pressure supplied to pipe 23, while port 63 registers with port opening 71, so that pipe 30 is also open to the atmosphere, so that fluid is vented from the piston 15 of the door operating motor.

It will therefore be seen that the piston 14 is automatically operated in an emergency application of the brakes, to effect the opening of the car door at the operating end of the car.

At the rear end of the car, the valve 46 is closed, since the brake valve handle has been removed, so that while fluid is supplied in an emergency application of the brakes to the pipe 49, this fluid is prevented by the closed valve 46 from flowing to the pipe 44, thus the door at the rear end is not opened nor is sand supplied to the rails, as the cut out piston 37 remains in its normal closed position.

The movement of piston 37 also opens passage 41 to fluid supplied to pipe 44 at the operating end of the car, and consequently fluid is supplied through pipe 42 for effecting the sanding of the rails.

If a break should occur in the emergency brake pipe 7, the emergency valve device 3 will be operated in the same manner as by turning the brake valve to emergency position and the operation of the apparatus will be the same as hereinbefore described.

In releasing after an emergency application, the emergency valve parts are moved to release position, and passage 88 is lapped, so that flow of fluid is cut off from pipe 49. This permits piston 37 to return valve 38 to its seat. Fluid in the piston chamber 16 then escapes through passage 24, lifting check valve 89, to pipe 39 which is now open through passage 86 and cavity 90 to exhaust port 91.

Having now described my invention, what I claim as new and desire to secure by Letters Patent, is:

1. The combination with fluid operated motors each controlling a car door, of means for controlling the fluid pressure on said motors and a removable device adapted to be applied at either end of the car for establishing communication from said means to one of said motors, 2. The combination with a fluid operated motor at each end of the car for controlling a car door, of means operated in an emergency for supplying fluid to operate said motors and a removable handle adapted to be applied at either end of the car for establishing communication through which fluid is supplied by said means to one of the motors.

3. The combination with a fluid operated motor at opposite ends of the car for controlling a car door, of a valve device adapted upon effecting an application of the brakes to supply fluid for operating said motors and a removable handle adapted to be applied to either end of the car for establishing communication through which said valve device supplies fluid to one of the motors.

4. The combination with two fluid operated motors each adapted to control a car door, a brake pipe, and an emergency valve device operated upon a reduction in brake pipe pressure for effecting an application of the brakes and for varying the fluid pressure on said motors to effect the opening of the car doors, of a valve for controlling communication from said valve device to the motors and a removable handle adapted to be applied at either end of the car for operating said valve to open said communication.

5. The combination with two fluid operated motors each adapted to control a car door, a brake pipe, and an emergency valve device operated upon a reduction in brake pipe pressure for effecting an application of the brakes and for supplying fluid to said motors for opening the car doors, of a normally closed valve at each end of the car for controlling communication from said valve device to said motors and a removable handle adapted upon application at one end of the car for operating the corresponding valve to open communication from said valve device to the motor at that end of the car.

6. In a double ended safety car equipment, the combination with a fluid operated motor at each end of the car for operating a corresponding car door, a brake pipe, and an emergency valve device operated upon a reduction in brake pipe pressure for effecting an application of the brakes and for supplying fluid to said motors for opening the car doors, of a normally closed valve at each end of the car for controlling communication from said valve device to the motors, a brake valve device at each end of the car, and a removable brake valve handle adapted upon application to the brake valve device at the operating end of the car for opening the corresponding valve.

7. The combination with a fluid operated motor for controlling a car door, of a valve device operated by fluid supplied for sanding the rails for opening communication through which fluid is varied on said motor.

8. The combination with a fluid operated motor for controlling a car door, of a valve device operated by the flow of fluid in sanding the rails for effecting the operation of said motor.

9. The combination with a fluid operated motor for controlling a car door, of a valve device operated by fluid supplied for sanding the rails for opening communication through which fluid is supplied to said motor for effecting the opening of the car door.

10. The combination with a fluid operated motor for controlling a car door, of an emergency valve device for effecting an application of the brakes and for supplying fluid for sanding the rails and a cut-out valve device operated by fluid supplied for sanding to open communication through which fluid is supplied to the motor.

11. In a double ended car equipment, the combination with a fluid operated motor at each end of the car for controlling a car door and a cut-out valve device associated with each motor for controlling communication through which the fluid pressure is varied on the motor, of a normally closed valve at each end of the car for controlling the supply of operating fluid to each cut-out valve, and a removable device adapted to be applied at either end of the car for opening the corresponding valve.

12. In a double ended car equipment, the combination with a fluid operated motor at each end of the car for controlling a car door and a cut-out valve device associated with each motor for controlling communication through which the fluid pressure is varied on the motor, of a normally closed valve for controlling the flow of fluid for sanding the rails, said sanding fluid being adapted to operate the cut-out valve devices, and a removable handle adapted to be applied at either end of the car for opening the corresponding valve.

13. In a double ended car equipment, the combination with a fluid operated motor at each end of the car for controlling a car door and a valve device for effecting an application of the brakes and supplying fluid for sanding the rails, of a normally closed valve at each end of the car for controlling communication through which fluid is supplied for sanding the rails, a removable handle adapted to be applied at either end of the car for opening the corresponding valve, and a cut-out valve device associated with each motor and operated by fluid supplied in sanding the rails for opening communication through which fluid is supplied to the corresponding motor.

14. In a double ended car equipment, the combination with a fluid operated motor at each end of the car for controlling a car door and an emergency valve device adapted to effect an application of the brakes and supply fluid for sanding the rails and for operating the door motors, of a normally closed valve at each end of the car for controlling the flow of sanding fluid, a removable handle adapted to be applied at either end of the car for opening the corresponding valve, and a cut-out valve device associated with each motor and operated by the flow of sanding fluid for opening communication from said emergency valve device to the corresponding door motor.

15. The combination with a brake valve device at each end of the car and a valve device automatically operating to supply fluid for sanding the rails, of a valve at either end of the car for controlling the flow of fluid for sanding and a removable handle adapted upon application to the brake valve device at either end of the car for opening the corresponding valve.

16. In a double ended car equipment, the combination with a valve device operated in an emergency for effecting an application of the brakes and for supplying fluid for sanding the rails, of a normally closed valve at each end of the car and a removable handle adapted upon application at one end of the car to open the corresponding valve and permit the flow of sanding fluid from said valve device.

In testimony whereof I have hereunto set my hand.

WALTER V. TURNER.